April 4, 1939.     H. W. PRICE ET AL     2,152,914
GEAR SHIFTER
Filed July 21, 1937     2 Sheets-Sheet 1
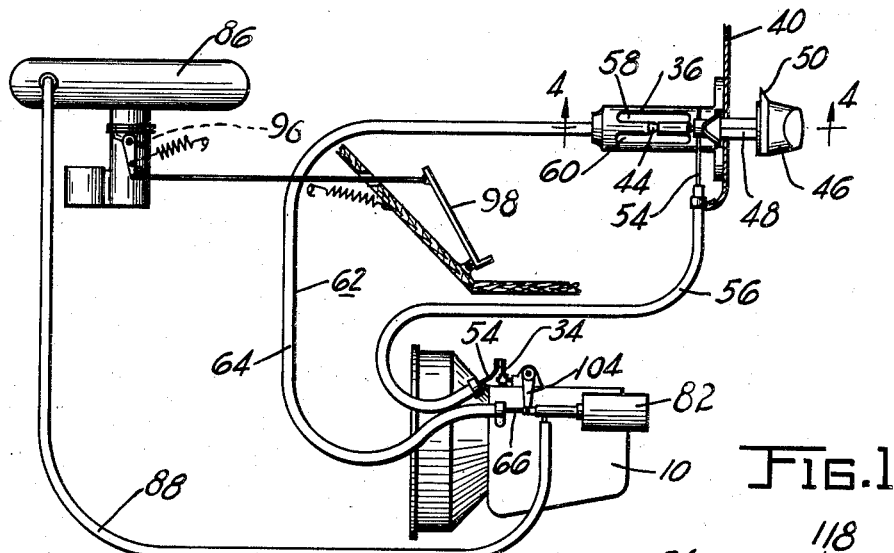
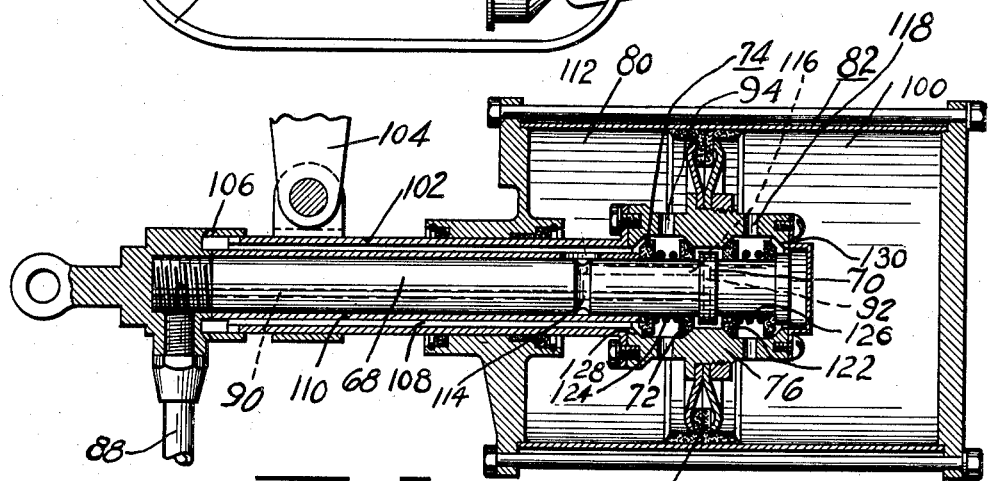
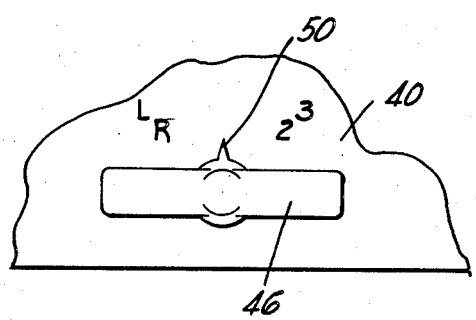
INVENTOR
HAROLD W. PRICE
EARL R. PRICE
BY
ATTORNEY April 4, 1939.　　　H. W. PRICE ET AL　　　2,152,914
GEAR SHIFTER
Filed July 21, 1937　　　2 Sheets-Sheet 2

INVENTOR
HAROLD W. PRICE
EARL R. PRICE
BY
ATTORNEY

Patented Apr. 4, 1939

2,152,914

UNITED STATES PATENT OFFICE 2,152,914

GEAR SHIFTER

Harold W. Price and Earl R. Price, South Bend, Ind., assignors to Bendix Products Corporation, South Bend, Ind., a corporation of Indiana Application July 21, 1937, Serial No. 154,736

3 Claims. (Cl. 74—335)

This invention relates in general to transmission operating power means and in particular to power means for operating the conventional three-speeds forward and reverse transmission of an automotive vehicle.

It is desirable, in the modern automotive vehicle, to clear the driver's compartment of all unnecessary controls, such, for example, as the conventional transmission operating shift lever. Accordingly, one of the principal objects of the invention is to provide a power means for operating the conventional transmission, the only manually operated control member of the power means constituting a hand operated knob conveniently mounted in the dash of the vehicle adjacent the driver's seat.

Yet another object of the invention is to provide a simple control means, readily accessible to the driver, for operating the transmission either by the physical effort of the driver or by power, or both. To this end there is provided, as disclosed in the preferred embodiment of the invention described in detail hereinafter, a manually operable selector mounted in the dash of the vehicle and means, interconnecting said selector and transmission operating power means, including a Bowden control or its equivalent for selecting the shift rail to be operated, and further including means for operating the shift rails manually and for operating the valve mechanism of a shift rail operating motor.

Other objects of the invention and desirable details of construction and combinations of parts will become apparent from the following description of a preferred embodiment, which description is taken in conjunction with the accompanying drawings, in which:

Figure 1 is a diagrammatic view of the transmission operating mechanism constituting our invention;

Figure 2 is a longitudinal sectional view of the pressure differential operated motor adapted to operate one or the other of the shift rails of the transmission;

Figure 3 is a front view of the manually operated selector constituting one of the principal elements of our invention;

Figure 5:
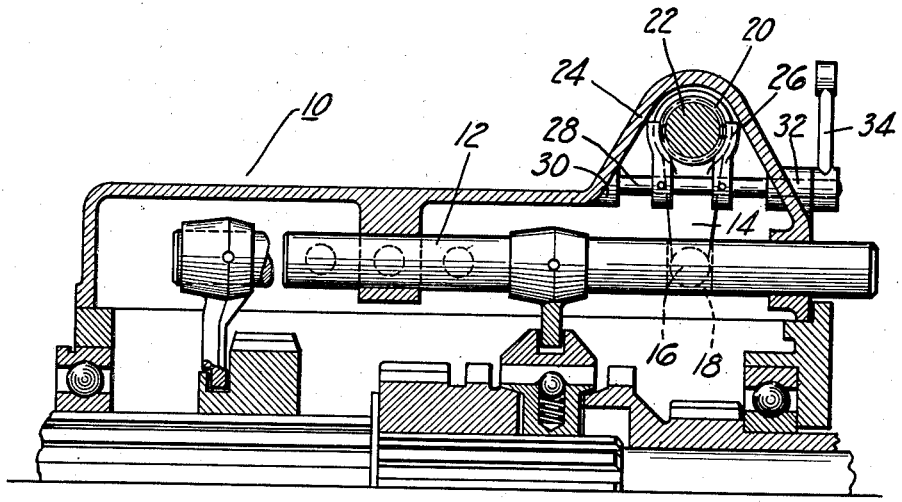
Figure 5 is a view disclosing, in section, part of a standard three-speeds forward and reverse transmission and a portion of the transmission operating means constituting our invention.

Referring now to Figure 1, disclosing a preferred embodiment of our invention, the numeral 10 indicates a standard three-speeds forward and reverse transmission of conventional design. As disclosed in Figure 5, the first and reverse gear shift rail 12 of the transmission and its juxtaposed high and second gear shift rail (not shown) are selectively operated by a crank 14 provided with a ball-shaped end member 16, adapted to fit within the oppositely disposed slots 18 in the rails. The crank 14 extends from a tubular member 20 sleeved over a pin 22 rotatably mounted in the casing 24 of the transmission. The member 20 is provided with a recessed portion into which fits a yoke member 26, the latter being secured at its lower end to a pin 28 journaled at 30 and 32 in the casing 24. Upon rotating the pin 28 by means of a crank 34, the yoke 26 serves to slide the tubular member 20 to nest the ball-shaped end member 16 into engagement with one or the other of the shift rails. This operation corresponds to the so-called cross shift operation of the conventional manually operated cross shift lever, when the same is operated to select one or the other of the shift rails prior to meshing the gears.

Figure 4:
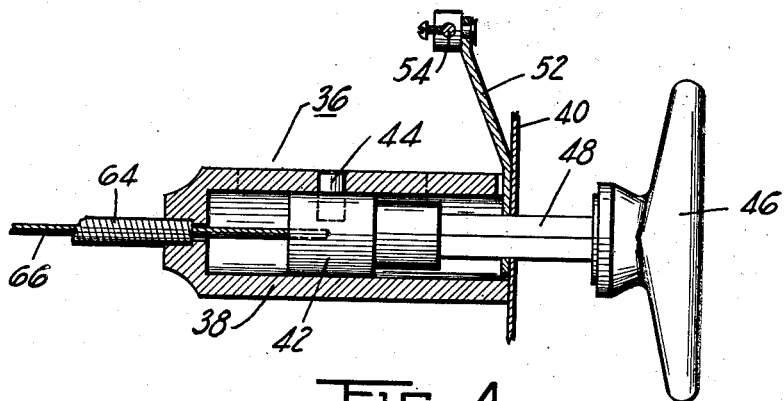
Figure 4 is a sectional view of the selector mechanism, taken on the line 4—4 of Figure 1.

One of the important features of the invention is in the means for operating the above-described rail selecting means. As disclosed in Figure 1 and shown in detail in Figure 4, there is provided a so-called selector 36, comprising a tubular housing member 38 adjustably secured to the engine side of the dash-board 40. From a tubular plunger 42, slidably mounted within the member 38, there projects a pin 44 adapted to fit within an H-shaped slot in the member 38. The plunger 42 is rotated by means of a hand operated knob 46 secured to the plunger by means of a rectangular-shaped pin 48. Upon rotating the knob counterclockwise so that a pointer 50 thereon is moved to the first and reverse gear position indicated by the numeral 1 and the letter r, Figure 3, a crank 52, Figure 4, serves to move a cable 54 of a Bowden control 56 to rotate the crank 34 and nest the ball 16 in the first and reverse gear shift rail 12. It follows that clockwise rotation of the knob 46 serves to nest the ball 16 in the second and high gear shift rail preparatory to establishing the transmission in either second or high gear.

Describing now the mechanism for moving the rails to shift the gears, having selected a shift rail to be moved, the knob 46 is either pushed in or pulled out to slide the pin 44 within one or the other of channels 58 and 60 of the H slot in the member 38. Describing the low gear shift, movement of the knob toward the driver serves, through the intermediary of a Bowden control 62 comprising a conduit 64 and a cable 66, to move a plunger 68 to the left, Figure 2, and, by means of a projection 70, to unseat a spring loaded valve member 72 and seat a valve member 74. The plunger member 68 is, with the valve parts in the position disclosed in Figure 2, that is with the transmission in neutral, urged into contact with the hub 76 of a piston 78. The left compartment 80 of a double-ended air suspended pressure differential operated motor 82, including a cylinder 84 and the aforementioned piston 78, is consequently evacuated by virtue of a connection with the intake manifold 86 of the car via a conduit 88, a duct 90 in the plunger 68, a duct 92 in the projection 70, and a port 94 in the hub 76.

As is well known in this art, when the throttle 96 is closed by release of an accelerator 98, the engine pistons function to partially evacuate the manifold, thus providing a source of vacuum to energize the transmission operating motor 82. As the left compartment 80 is evacuated, as above described, the air within the right compartment 100 of the motor, at atmospheric pressure, creates a pressure differential to move the piston 78 to the left and move the rail 12, the rail and piston being interconnected by means of a hollow connecting rod 102 and a crank 104. The transmission is thus established in low gear. As is disclosed in Figure 2, compartments 80 and 100 are normally vented to the atmosphere via a port 106, the spacing 108 between the hollow connecting rod 102 and a sleeve 110, the port 94 in the hub 76 of the piston 78, a port 112 in the sleeve 110, an annular groove 114 in the plunger 68, a duct 116 in said plunger, and a port 118 in the hub 76. Valvular members 74 and 120 are normally unseated, that is, as disclosed in Figure 2, they do not abut the hub 76 when the transmission is in neutral and the piston is in its intermediate position. It will be noted that should the knob 46 be held momentarily in a partially extended position during the operation of placing the transmission in low gear, the hub 76 of the piston will move to the left under the load of the atmosphere to again seat the valve 72, the parts again being in the position disclosed in Figure 2. This is known as a lapped position of the valve mechanism, the action constituting what is known in the art as a follow-up valve action.

The above-described valve cracking operation may, of course, be repeated until the transmission is completely meshed in low gear.

Pushing the knob toward the dash serves to establish the transmission in reverse gear, assuming that the knob has been rotated to place the pin 44 in the channel 60. In this operation, the spring loaded valve 122 is unseated, the spring loaded valve member 72 is seated, resulting in the right compartment 100 of the motor 82 being evacuated. As will be obvious in Figure 2 and from the previous description, the compartment 80 is at the time vented to atmosphere, resulting in the piston 78 being subject to a differential of pressure to move the same to the right and thereby establish the transmission in reverse gear. The follow-up to-lap action of the valve mechanism is the same as previously described.

It will be obvious that the above-described operation of the motor and its valve mechanism will be duplicated in placing the transmission in either second or high gear, when the knob is rotated to place the pin 44 in the channel 58. A repetition of the description of the motor operation is accordingly believed to be unnecessary.

It will be noted that in the event of the failure of the power means the transmission may be operated solely by the physical effort of the driver: furthermore, with the above-described mechanism, the transmission may be operated concurrently by the power means and by the physical effort of the driver. Describing this action, when the valve members 72, 74, 120 and 122 and adjacent springs 124 and 126 go solid with the projection 70 and abutments 128 or 130, there is provided means for moving the rod 102 to the left or right to place the transmission in gear by the physical effort of the driver. For example, in placing the transmission either in low gear or in high gear, the cable within the conduit 64, plunger 68, projection 70, valve members 72 and 74, and spring member 124 become a solid connection, cooperating with the hub 76, connecting rod 102 and crank 104, to actuate the transmission by the physical effort of the driver. If at the time the compartment 80 is evacuated, then this physical effort is supplemented by the load from the motor.

There is thus provided a dash mounted manually operable selector for first selecting the gear shift rail of the transmission to be operated and then effecting the operation of the rail to establish the gear setting, either by power or by the physical effort of the driver, or by both.

While one illustrative embodiment has been described, it is not our intention to limit the scope of the invention to that particular embodiment, or otherwise than by the terms of the appended claims.

We claim:

1. In an automotive vehicle, a supporting member, a change speed transmission having a plurality of spaced shifter bars movable longitudinally to establish different gear relations, a selector member mounted for reciprocating movement in one plane to select a desired shifter bar and movable in another plane to shift the selected shifter bar, power means including a pressure responsive element connected to the selector member for imparting shifting movements thereto, a single manually operable control member, means for mounting said control member on the supporting member for movement in one plane for gear selecting and for movement in a perpendicular plane for gear shifting, a Bowden cable device connecting said selector member and control member for effecting selecting movement of the selector member in accordance with movement of the control member in said one plane, a second Bowden cable device separate from said first Bowden cable device for connecting the control member and the pressure responsive element and including valve means for controlling the energization of the power means in accordance with movement of the control member in said perpendicular plane, said valve means including parts connected by a lost motion connection and respectively connected with the second Bowden control device and said pressure responsive element whereby, in the event of power failure, movement of the control member in said perpendicular plane will take up said lost motion connection and effect manual shifting movement of the selector member.

2. In an automotive vehicle, a supporting member, a change speed transmission having a plurality of spaced shifter bars movable longitudinally to establish different gear relations, a selector member mounted for reciprocating movement in one plane to select a desired shifter bar and movable in another plane to shift the selected bar, power means including a pressure responsive element connected to the selector member for imparting shifting movements thereto, a single manually operable control member, means for mounting said control member on the supporting member for movement in one plane for gear selecting and for movement in a perpendicular plane for gear shifting, a mechanical force transmitting means including a longitudinally movable member for connecting the selector member and control member for effecting selecting movement of the selector member in accordance with movement of the control member in said one plane, a movable valve member for controlling the energization of the power means, a second mechanical force transmitting means separate from said first transmitting means for connecting said valve member and control member for effecting operation of the former and consequent energization of the power means in accordance with movement of the control member in said perpendicular plane, and means remote from said control member for connecting said second transmitting means and the pressure responsive element for manually moving the latter and the selector member connected thereto in the event of power failure.

3. In an automotive vehicle having a supporting member, a change speed transmission having a plurality of shifter bars, a selector member mounted for reciprocating movement to selectively engage said bars, power means including a pressure responsive element connected to said selector member for shifting the latter and shifter bar engaged thereby, valve means for controlling the energization of the power means, manual operating means, means for mounting the last named means on the supporting member for movement in two perpendicular planes, mechanical means including a longitudinally movable member for connecting said selector member and manual operating means for controlling the shifter bar engaging movement of the selector member in accordance with movement of the manual operating means in one of said two planes, and other mechanical means separate from said first mechanical means for connecting the valve means and manual operating means to control the valve means in accordance with movement of the manual means in the other of said two planes.

HAROLD W. PRICE.
EARL R. PRICE.